(12) United States Patent
Boudard et al.

(10) Patent No.: US 8,561,423 B2
(45) Date of Patent: Oct. 22, 2013

(54) ABSORPTION-TYPE COOLING DEVICE AND ASSOCIATED MOTOR VEHICLE

(75) Inventors: Emmanuel Boudard, Voisins le Bretonneux (FR); Vital Bruzzo, Vicenza (IT)

(73) Assignees: Ecoclim S.A., Sion (CH); Peugeot Citroen Automobiles SA, Velizy Villacoublay (FR)

( * ) Notice: Subject to any disclaimer, the term of this patent is extended or adjusted under 35 U.S.C. 154(b) by 656 days.

(21) Appl. No.: 12/299,260

(22) PCT Filed: May 2, 2007

(86) PCT No.: PCT/FR2007/000748
§ 371 (c)(1),
(2), (4) Date: Feb. 27, 2009

(87) PCT Pub. No.: WO03/048659
PCT Pub. Date: Jun. 12, 2003

(65) Prior Publication Data
US 2009/0193829 A1    Aug. 6, 2009

(30) Foreign Application Priority Data
May 2, 2006   (FR) ..................................... 06 51567

(51) Int. Cl.
*F25B 15/00* (2006.01)
*F25B 27/00* (2006.01)
*B60H 1/32* (2006.01)
*F24B 1/06* (2006.01)
*F28D 7/10* (2006.01)

(52) U.S. Cl.
USPC ................... 62/476; 62/238; 62/244; 62/101; 165/115; 165/140

(58) Field of Classification Search
USPC ........ 62/238.3, 244, 271, 80.4, 101; 165/115, 165/140
See application file for complete search history.

(56) References Cited

U.S. PATENT DOCUMENTS 2,215,532 A * 9/1940 Richardson ..................... 165/97
3,279,207 A * 10/1966 Leonard, Jr. .................... 62/141
(Continued)

FOREIGN PATENT DOCUMENTS

DE    4307363 A1    9/1994
DE    4413030 C1    4/1995
(Continued)

OTHER PUBLICATIONS

International Search Report mailed Oct. 1, 2007 in PCT/FR2007/000748.

*Primary Examiner* — Khoa Huynh
*Assistant Examiner* — Timothy K Trieu
(74) *Attorney, Agent, or Firm* — Nicolas E. Seckel

(57) ABSTRACT

This device (11) comprises a generator (33) for separating a mixed fluid into a refrigerant fluid and an absorbent fluid. It comprises a refrigerant fluid condenser (35), linked to a generator (33) and an evaporator (51) of refrigerant fluid linked to a condenser (35) by a feeder conduit (61) into refrigerant fluid. This device (11) also comprises a refrigerant fluid absorber (55) linked to an evaporator (51) and a generator (33). The device (11) comprises a refrigeration circuit (53) using refrigerant fluid. The circuit (53) is linked to at least a first heat exchanger (77) located outside the evaporator (51). The circuit (53) is linked to at least a first evaporation area of the evaporator (51), up and down stream from the first heat exchanger (77) to make part of the refrigerant circulate as a refrigerant fluid in the refrigeration circuit (53). For application in air conditioning for motor vehicles.

20 Claims, 4 Drawing Sheets

(56) References Cited

U.S. PATENT DOCUMENTS

| | | | |
|---|---|---|---|
| 4,472,947 A * | 9/1984 | Saito et al. | 62/141 |
| 4,691,528 A | 9/1987 | Tongu | |
| 5,463,880 A * | 11/1995 | Nishino et al. | 62/484 |
| 5,857,354 A * | 1/1999 | Ishiguro | 62/476 |
| 5,896,747 A * | 4/1999 | Antohi | 62/101 |
| 5,901,786 A * | 5/1999 | Patel et al. | 165/283 |
| 5,911,746 A * | 6/1999 | Kuhlenschmidt | 62/102 |
| 6,009,721 A | 1/2000 | Fukuda et al. | |
| 6,134,910 A * | 10/2000 | Sato et al. | 62/484 |
| 6,176,101 B1 * | 1/2001 | Lowenstein | 62/484 |
| 6,182,744 B1 * | 2/2001 | Nakamura et al. | 165/140 |
| 6,217,839 B1 * | 4/2001 | Hess et al. | 423/243.01 |
| 6,230,517 B1 * | 5/2001 | Ishiguro et al. | 62/476 |
| 6,233,968 B1 * | 5/2001 | Nishiguchi et al. | 62/476 |
| 6,247,331 B1 * | 6/2001 | Nishiguchi et al. | 62/476 |
| 6,523,357 B1 * | 2/2003 | Katayama | 62/141 |
| 6,564,572 B1 * | 5/2003 | Uchimura et al. | 62/476 |
| 6,817,406 B1 * | 11/2004 | Inoue et al. | 165/115 |
| 6,818,406 B2 * | 11/2004 | Goronzy et al. | 435/7.1 |
| 6,823,682 B1 * | 11/2004 | Jenkins et al. | 62/141 |
| 7,063,139 B2 * | 6/2006 | Horn et al. | 165/203 |
| 7,900,472 B2 * | 3/2011 | Boudard et al. | 62/476 |
| 2005/0198983 A1 | 9/2005 | Bruzzo et al. | |
| 2006/0144078 A1 * | 7/2006 | Inoue et al. | 62/494 |

FOREIGN PATENT DOCUMENTS

| | | |
|---|---|---|
| DE | 20005951 U1 | 9/2000 |
| EP | 0899521 A | 3/1999 |
| EP | 1361348 A | 11/2003 |
| JP | 05340637 A | 12/1993 |
| JP | 5340637 A * | 12/1993 |
| WO | WO 03048659 A | 6/2003 |

* cited by examiner

ABSORPTION-TYPE COOLING DEVICE AND ASSOCIATED MOTOR VEHICLE

BACKGROUND ART

The present invention relates to an absorption cooling device of the type comprising:
- a device for generating cooling fluid and absorbent fluid by separating a mixed fluid;
- a cooling fluid condenser, which is connected to the generator;
- a cooling fluid evaporator which is connected to the condenser by means of a cooling fluid supply conduit, the evaporator having at least one region for evaporation of the cooling fluid in which the supply conduit opens;
- a cooling fluid absorber which is connected to the evaporation region and which is connected to the generator by means of an absorbent fluid supply conduit and a mixed fluid discharge conduit; and
- a cooling circuit comprising a conduit for circulation of cooling fluid which has an upstream inlet and a downstream outlet which are connected to the evaporation region, the conduit comprising a reservoir of cooling fluid, a pump and a first heat-exchanger which are mounted in series.

WO-A-01/18463 discloses a device of the above-mentioned type comprising a generator in which a mixed fluid comprising a cooling fluid and an absorbent fluid is separated in order to obtain a gaseous current of cooling fluid, and a liquid current of absorbent fluid.

This device further comprises a cooling fluid condenser which receives the gaseous current and which allows the cooling fluid to be reliquefied. This device comprises a cooling fluid evaporator which is connected to the condenser and in which the liquid cooling fluid from the condenser is evaporated using a nozzle. This evaporation produces frigories which are used for the purposes of cooling, via the cooling system.

The evaporated cooling fluid is conveyed to an absorber which receives a liquid current of absorbent fluid. The liquid current is sprayed in the absorber in order to form very fine drops which absorb the evaporated cooling fluid.

A mixed liquid comprising the cooling fluid and the absorbent fluid is collected in the base of the absorber in order to be conveyed to the generator.

Such a device efficiently produces frigories which can be used in a climate-control assembly, without using a cooling fluid which is harmful to the environment.

However, if a device of the above-mentioned type is installed in a motor vehicle, the accelerations and the inclinations of the vehicle have a tendency to disrupt the evaporation nozzle and the spraying of the absorbent solution. Furthermore, such a device is bulky.

SUMMARY OF THE INVENTION

An object of the invention is therefore to provide an absorption cooling device which may readily be installed in a vehicle, in a compact manner.

To this end, the invention relates to a cooling device of the above-mentioned type, characterised in that the circulation conduit is provided with a non-return valve which is arranged between the first heat-exchanger and the downstream outlet thereof in order not to discharge the cooling fluid present in this portion of the conduit into the evaporator in the event of the pump stopping.

The device according to the invention may comprise one or more of the following features, taken in isolation or according to any technically possible combination:
- the circulation conduit is provided with a controllable blocking valve which is arranged upstream of the reservoir in order to limit the filling of the reservoir;
- the first heat-exchanger is mounted higher than the reservoir in order to allow gravity to fill the reservoir with the cooling fluid present between the first heat-exchanger and the reservoir when the pump is stopped;
- the cooling system opens upstream in a downstream portion of the evaporation region and opens downstream in an upstream portion of the evaporation region;
- the evaporation region comprises at least one evaporation plate, the cooling system comprising means for wetting the evaporation plate supplied by the cooling system and the cooling fluid supply conduit;
- the discharge conduit comprises a cooling system which comprises a reservoir of mixed fluid, a pump and a second heat-exchanger which are mounted in series and a mixed fluid branch conduit which has an upstream inlet for the conduit common to the discharge conduit and a downstream outlet which are connected to the absorption region in order to be able to recycle a portion of the mixed fluid directly into the absorber;
- the branch conduit comprises a non-return valve;
- the cooling system comprises a controllable blocking valve which is arranged upstream of the reservoir of mixed fluid;
- the absorption region comprises at least one absorption plate, the cooling system comprising means for wetting the absorption plate which are supplied via the branch conduit and via the absorbent fluid supply conduit; and
- the evaporation region and the absorption region are located facing each other and together delimit a chamber for evaporated cooling fluid to migrate from the evaporator towards the absorber.

The invention also relates to a motor vehicle, characterised in that it comprises:
- a front face which is capable of receiving an external flow of air;
- a climate-control assembly for the passenger space; and
- a device as defined above, the first heat-exchanger being placed in a heat-exchange relationship with the climate-control assembly.

The vehicle according to the invention may comprise one or more of the following features, taken in isolation or according to any technically possible combination:
- the second heat-exchanger and the cooling fluid condenser are arranged beside each other on the front face in a first position in order to receive the coldest air available;
- the second heat-exchanger and the cooling fluid condenser are arranged one on top of the other on the front face in a first position in order to receive the coldest air available;
- the second heat-exchanger and the condenser have the same cooling member with two separate circulation systems in order to reduce the thickness of the front face;
- the generator is supplied by the heat produced by the engine of the vehicle; and
- the supply of the generator is controlled by means of an output control valve placed in the cooling system of the engine.

BRIEF DESCRIPTION OF THE DRAWINGS

The invention will be better understood from a reading of the following description, given purely by way of example and with reference to the appended drawings, in which.

DETAILED DESCRIPTION OF PARTICULAR EMBODIMENTS

Figure 1:
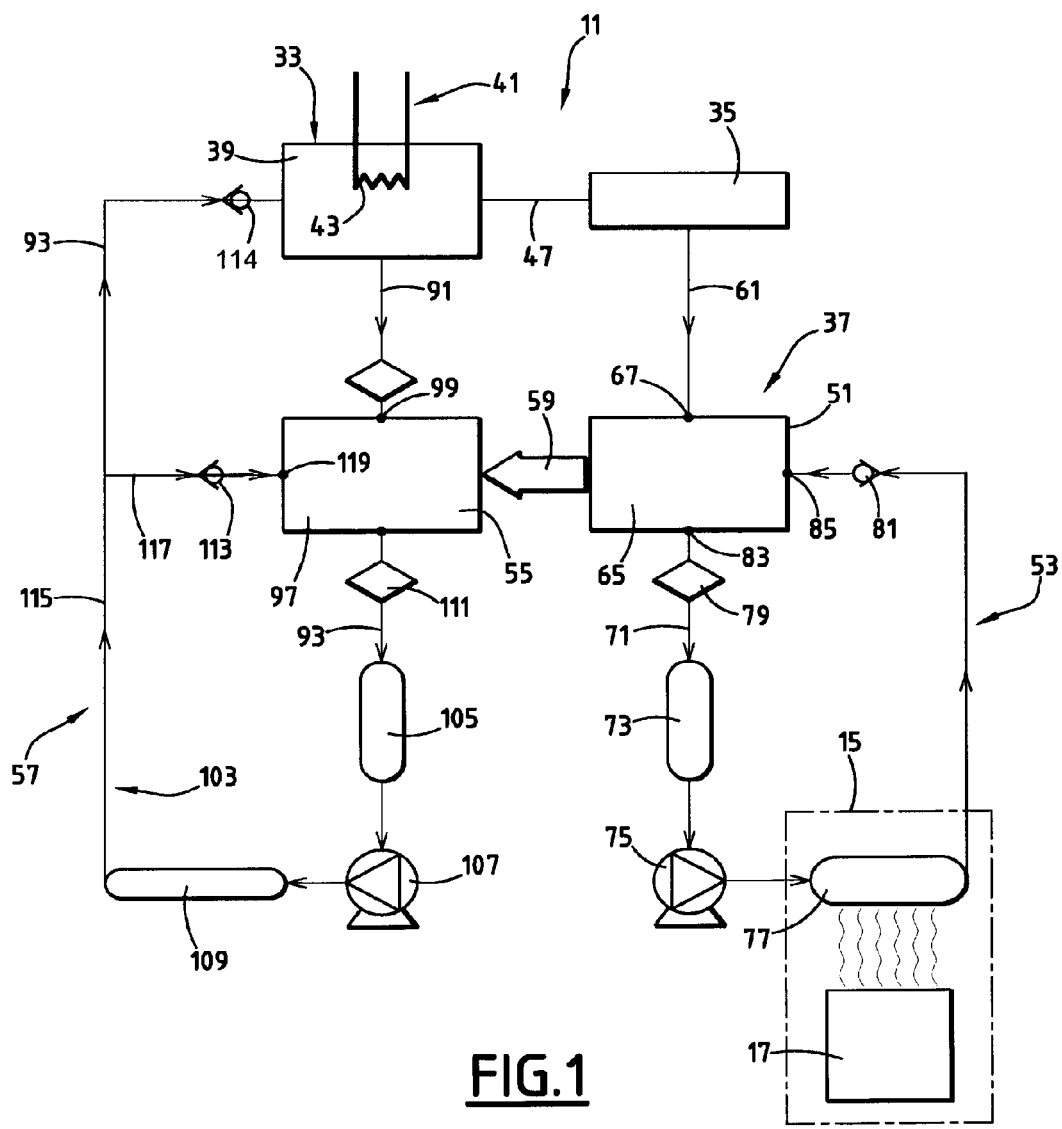
FIG. 1 is a synoptic block diagram of a first cooling device according to the invention.

The first absorption cooling device 11 according to the invention, illustrated in FIG. 1, is, for example, arranged in a motor vehicle. The vehicle comprises in particular a passenger space 15 and a passenger space climate-control assembly 17 which is placed in a heat-exchange relationship with the device 11.

Figure 3:
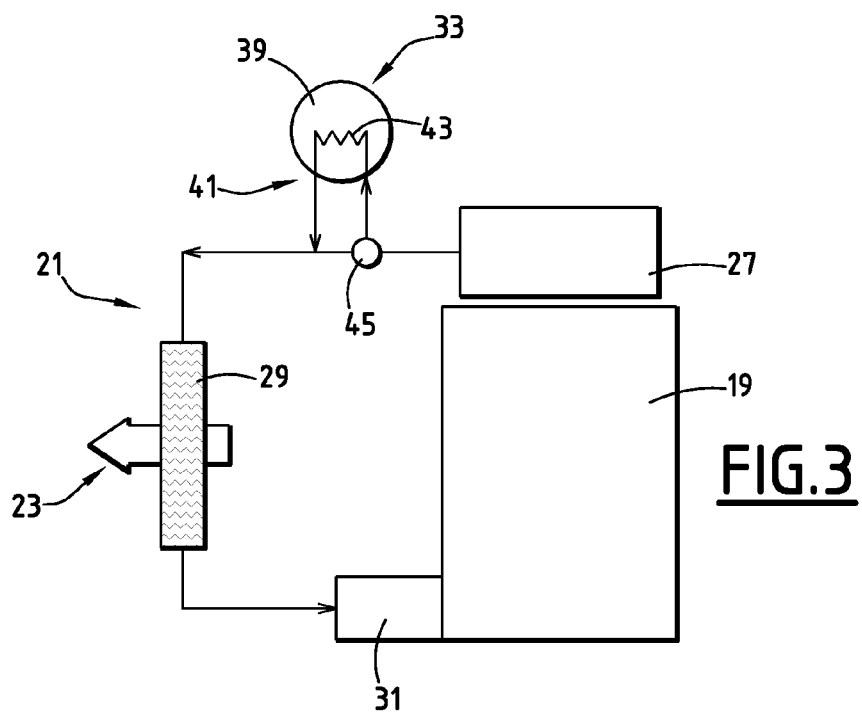
FIG. 3 is a synoptic block diagram of the heating means of the generator of the device of FIG. 1.
Figure 4A:
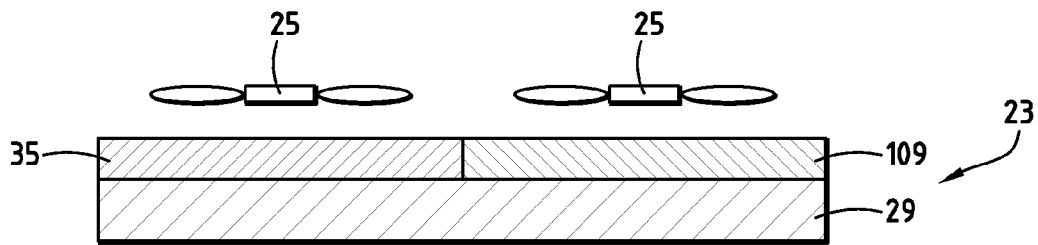
FIGS. 4A to 4C are schematic cross-sections through a horizontal plane of three variants of a front face of a vehicle equipped with the first device according to the invention.

The vehicle further comprises, as illustrated by FIGS. 3 and 4A, an engine 19 which is provided with an engine cooling system 21, and a front face 23 which is capable of receiving a flow of external air via one or more fans 25 which are illustrated in FIG. 4A.

As illustrated in FIG. 3 and in conventional manner, the engine cooling system 21 comprises a used engine water discharge casing 27 which is used in particular to heat the non-passenger space, a radiator 29 which is arranged on the front face 23 which is intended to cool the water from the engine and a water collector 31.

With reference to FIG. 1, the device 11 comprises a device 33 for generating cooling fluid and absorbent fluid by separating a mixed fluid, a condenser 35 for evaporated cooling fluid and an evaporator/absorber assembly 37.

The generator 33 comprises a chamber 39 which is intended to receive the mixed fluid formed by an admixture of liquid cooling fluid and liquid absorbent fluid.

The absorbent fluid is formed, for example, by a solution of lithium bromide and the cooling fluid is formed by water.

In a variant, the absorbent fluid is formed by water and the cooling fluid by ammonia solution.

The heating means comprise an engine cooling liquid circulation conduit 41 comprising a region 43 which is arranged in the chamber 39 in order to place the engine cooling liquid in a heat-exchange relationship with the mixed fluid contained in the chamber 39.

As illustrated in FIG. 3, the conduit 41 is tapped at the inlet thereof on the engine cooling system 21 via a control valve 45 which is arranged downstream of the water outlet casing 27 and upstream of the radiator 29. Preferably, the valve 45 is located close or sufficiently close to benefit from maximum heating. The conduit 41 opens at the outlet thereof in the engine cooling system 21 downstream of the valve 45 and upstream of the radiator 29. If a device which is intended to heat the water for the comfort of the passenger space exists in the water system, it would be advantageous to position it upstream of the conduit 41.

The condenser 35 is connected to the generator 33 by means of a conduit for passage of evaporated cooling fluid.

As illustrated in FIG. 4A, the condenser 35 is arranged in the front face 23 of the vehicle, on the radiator 29, upstream relative to the flow direction of air in the front face 23. It is used to phase change the cooling fluid from a vaporised state to a liquid state.

The assembly 37 comprises an evaporator 51, a cooling system 53 which is intended to transmit the frigories produced in the evaporator 51, an absorber 55 which is connected to the evaporator 51, a cooling system 57 for the absorber 55, and means 59 for conveying evaporated cooling fluid between the evaporator 51 and the absorber 55.

In the example illustrated in the Figure, the evaporator 51 is connected to the condenser 35 by means of a liquid cooling fluid supply conduit 61.

Figure 2:
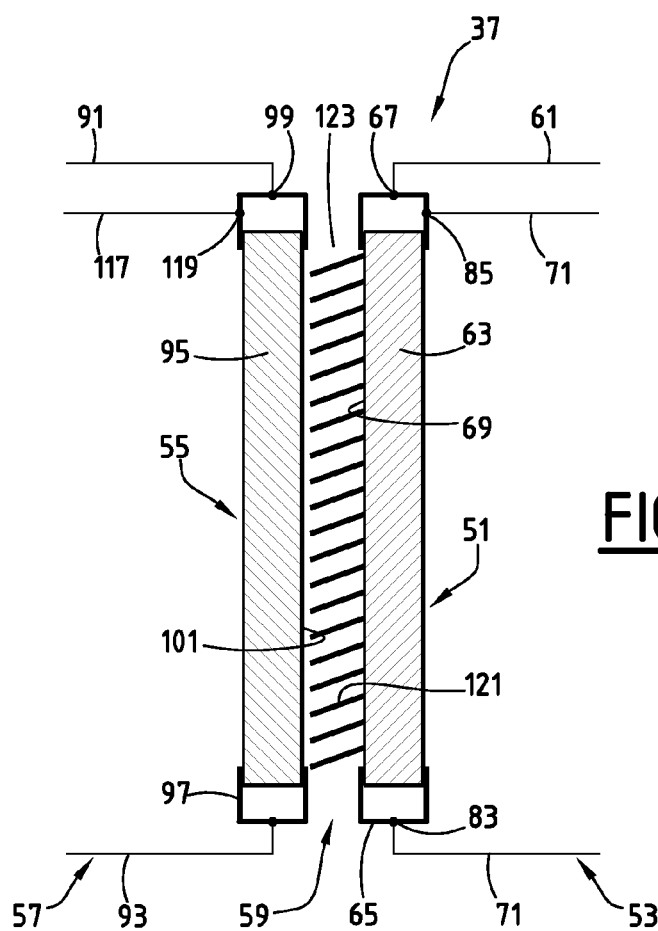
FIG. 2 is a schematic cross-section through a vertical plane of an evaporator/absorber assembly of the device of FIG. 1.

As illustrated in FIG. 2, the evaporator 51 comprises at least one porous plate 63 and a liquid cooling fluid collector 65 arranged below a lower downstream portion of the plate 63.

The plate 63 may comprise, in its upstream upper portion, liquid cooling fluid supply inlet 67 into which the supply conduit 61 opens. The plate 63 further has an evaporation surface from which the gas will travel over a substantially planar and vertical surface 69 which extends opposite the absorber 55.

In the embodiment illustrated in FIG. 1, the cooling circuit 53 comprises a conduit 71 for circulation of cooling fluid and, mounted in series in a downstream direction on the conduit 71, a cooling fluid reservoir 73, a pump 75 and a first heat-exchanger 77.

The cooling system 53 further comprises a controllable blocking valve 79 which is arranged in the conduit 71 between the evaporator 51 and the reservoir 73.

Preferably, a non-return valve 81 is arranged between the first heat-exchanger 77 and the evaporator 51 in order to block the fluid present between the heat-exchanger 77 and the non-return valve 81 when the pump 75 is idle.

The circulation conduit 71 extends between an upstream inlet 83 which opens into the collector 65 and a downstream outlet 85 which opens into an upper upstream portion of the porous plate 63 which is located in the region of the cooling fluid supply inlet 67.

The liquid cooling fluid collected in the collector 65 thus supplies the circulation conduit 71.

Upstream of the porous plate 63, there is therefore a region for mixing the cooling fluid from the supply conduit 61 and the cooling fluid flowing in the cooling circuit 53. It will therefore be appreciated that there may exist an optional conduit which communicates between the supply conduit 61 and the reservoir 73.

The reservoir 73 has a volume substantially greater than that of the circulation conduit 71. This volume is, for example, at least 1.5 times greater than that of the circulation conduit 71.

The pump 75 operates in a continuous manner at a flow rate of between 100 and 5000 liters per hour and, for example, substantially equal to 1000 liters per hour.

The heat-exchanger 77 is placed directly in a heat-exchange relationship with the climate-control assembly 17.

The valve 79 is arranged between the collector 65 and the reservoir 73 in order to prevent the evaporation of the cooling fluid contained in the reservoir 73 towards the evaporator 51 when the device 11 is inactive. Preferably, the closure of the valve 79 is controlled in accordance with a level in the reservoir 73 that is not to be exceeded when the pump 75 is stopped. It will thus be appreciated that, in the case of the optional conduit, set out above, a valve is required in order to arrive at the same result upstream of the tapping of the conduit.

Preferably, the heat-exchanger 77 is mounted higher than the reservoir 73 in order to cause the fluid present between the heat-exchanger 77 and the reservoir 73 to migrate towards the reservoir 73 by means of gravity when the pump 75 is idle.

The absorber 55 is connected to the generator 33 via a liquid absorbent fluid supply conduit 91 and via a liquid mixed fluid discharge conduit 93.

As illustrated in FIG. 2, it comprises a porous absorption plate 95 and a mixed fluid collector 97 arranged below a lower downstream portion of the plate 95.

The plate 95 may have, in the upper upstream portion thereof, an upper supply inlet 99 for liquid absorbent fluid. The supply conduit 91 opens in this inlet 99.

The plate 95 further has an absorption surface for the passage of gas from the evaporator 51 to the substantially planar and vertical surface 101 arranged opposite the evaporation surface 69 of the evaporator 51.

The cooling circuit 57 comprises a conduit 103 for recirculation of mixed fluid and, mounted in a downstream direction on the conduit 103, a mixed fluid reservoir 105, a mixed fluid circulation pump 107 and a second heat-exchanger 109. The cooling system 57 further comprises an optional valve 111 for isolating the reservoir 105. In the same manner as the valve 81, a non-return valve 113 may be provided. It may also be envisaged that a non-return valve 114 may be mounted upstream of the inlet of the generator 33. Finally, it may also be envisaged that a non-return valve may be mounted on the conduit 47, that is to say, between the generator 33 and the condenser 35 in order to more precisely control the gaseous current of cooling fluid arriving in the condenser 35.

The circulation conduit 103 comprises an upstream portion 115 which is formed by an upstream portion of the discharge conduit 93 which is connected to the collector 97, and a downstream branch portion 117 which connects the upstream portion 115 to an inlet 119 for supplying the absorption plate 95 with recycled liquid mixed fluid.

As illustrated in FIG. 2, the inlet 119 is located in the upstream portion of the plate 95, in the region of the absorbent fluid supply inlet 99. In this manner, the upstream portion of the plate 95 forms a mixing region between the liquid absorbent fluid and the recycled liquid mixed fluid. In the same manner as in the cooling fluid system, an optional conduit may be provided to communicate directly between the conduit 91 and the reservoir 105.

The reservoir 105 is mounted on the upstream portion 115 of the conduit 103. The volume thereof is substantially equal to or less than the volume of the recirculation conduit 103.

The optional guiding means 59 are formed by partially open parallel surfaces 121 which are arranged between the evaporation surface 69 and the absorption surface 101. The surfaces 121 constitute "clerestory" apertures which are inclined in the example in a downward direction from the evaporation surface 69 to the absorption surface 101. By way of a variant, a grid may be provided either as an alternative or in addition to the apertures 121. In this second instance, preferably, the assembly forms a sandwich which is formed consecutively by the evaporation surface 69, a grid, the surfaces 121 which are provided with apertures, a grid and the absorption surface 101.

The space delimited between the surfaces 69 and 101 forms a chamber 123 for migration of the evaporated coolant from the evaporation surface of the surface 69 of the evaporator 51 towards the absorption surface of the surface 101 of the absorber 55.

The mixed fluid circulation pump 107 operates in a continuous manner. It has an output of between 100 liters per hour and 5000 liters per hour, preferably substantially equal to 1000 liters per hour.

Alternatively, and in order to simplify the device 11, the mixed fluid circulation pump 107 and the cooling fluid circulation pump 75 may be propelled by a common motor (not illustrated).

The second heat-exchanger 109 is mounted on the front face 23 of the vehicle upstream of the radiator 29, beside the condenser 35 in the example illustrated in FIG. 4A.

The valve 111 is interposed between the collector 97 and the reservoir 105. The valve 113 is mounted on the downstream portion 117 of the conduit 103.

An optional conduit which is provided with a pump may be provided from the outlet of the pump 75 to the outlet of the pump 107 in order to be able to rapidly change the concentration of the mixed fluid upstream of the second heat-exchanger 109. This is in particular ideal for preventing the crystallisation of salts contained in the mixed fluid by means of dissolution of the cooling fluid in the mixed fluid, that is to say, by reducing the salt concentration of the mixed fluid.

The operation of the first device 11 according to the invention for the climate-control of the passenger space 15 of a motor vehicle will now be described.

During operation, when the climate-control assembly 15 must cool the passenger space 11, the engine cooling liquid control valve 45 is activated in order to cause part of the engine cooling liquid to flow through the heat-exchange region 43 into the generator 33. The generator 33 contains a quantity of liquid mixed fluid sufficient to immerse the region 43.

Under the effect of the heating by the region 43, the liquid mixed fluid is separated into a gaseous current of cooling fluid and liquid absorbent fluid.

The gaseous current is collected in the passage conduit 47, then condensed in the condenser 35 in order to form a current of liquid cooling fluid. The current of liquid cooling fluid is introduced into the evaporator 51 through the supply inlet 67. It thus wets the porous evaporation plate 63, which allows cooling fluid to pass in the form of gas through the surface 69 of this plate 63, from the evaporation of part of the liquid cooling fluid.

This evaporation produces frigories which are collected by the liquid cooling fluid circulating in the plate 63. The cooled liquid cooling fluid is collected in the collector 65. The temperature of the liquid cooling fluid in the collector 65 is, for example, between 2 and 4° C.

The valve 79 is open so that the liquid contained in the collector 65 continuously supplies the reservoir 73. The pump 75 is activated in order to pump the liquid cooling fluid through the first exchanger 77 where it is subject to heat-exchange with the climate-control assembly 17. During this heat-exchange, the liquid is heated, for example, approximately from 4° C. to 10° C.

Subsequently, the heated liquid cooling fluid passes through the non-return valve 81 and is reintroduced into the evaporator 51 through the downstream outlet 85. It is therefore mixed with the liquid cooling fluid from the supply conduit 61 upstream of the plate 63.

The cooling fluid evaporated on the evaporation surface of the surface 69 is directed towards the absorption surface of the surface 101 through the chamber 123, the apertures of the surface 121 in particular allowing splashes of liquids being discharged from the surfaces to be prevented.

At the same time, the valve 111 and the mixed fluid circulation pump 107 are activated, so that a current of liquid mixed fluid flows from the absorber 55 through the upstream portion 103 and the downstream portion 117.

The liquid absorbing fluid from the generator 33 is introduced into the absorber 55 through the supply conduit 91 in order to wet the absorption plate 95 through the inlet 99. The liquid absorbent fluid circulating in the plate 95 therefore collects, via the surface 101, the gaseous cooling fluid conveyed from the chamber 123 and becomes heated. The liquid mixed fluid thus formed flows towards the mixed fluid collector 97.

The liquid mixed fluid is introduced into the reservoir 105 then pumped through the pump 107 to the second heat-exchanger 109 where it is cooled by means of air convection. It is then separated into a first portion which is reintroduced into the generator 33 and a second portion which is recycled in the absorber 55 through the inlet 119. The recycled cooling liquid mixed fluid is therefore mixed with the liquid absorbent fluid upstream of the plate 95 and cools it.

Figure 4B:
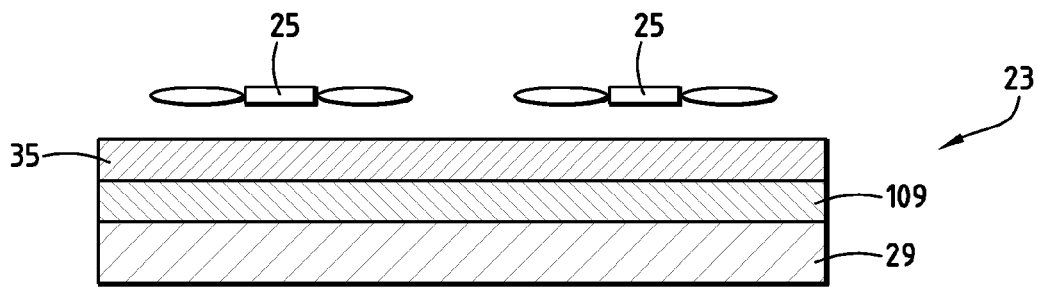

In a first motor vehicle variant, illustrated in FIG. 4B, the second heat-exchanger 109 is mounted directly on the radiator 29. However, in contrast to the vehicle illustrated in FIG. 4A, the condenser 35 is mounted on the second exchanger 109 upstream thereof relative to the air flow direction.

In an improvement to the first variant, the condenser 35 and the second exchanger 109 have the same cooling member (exchange surface and water case which thermally communicate) having two separate circulation systems, which allows the thickness of the system to be reduced compared with FIG. 4B. The fluids of the condenser 35 and the second exchanger 109 are similar in terms of operating temperature.

Figure 4C:
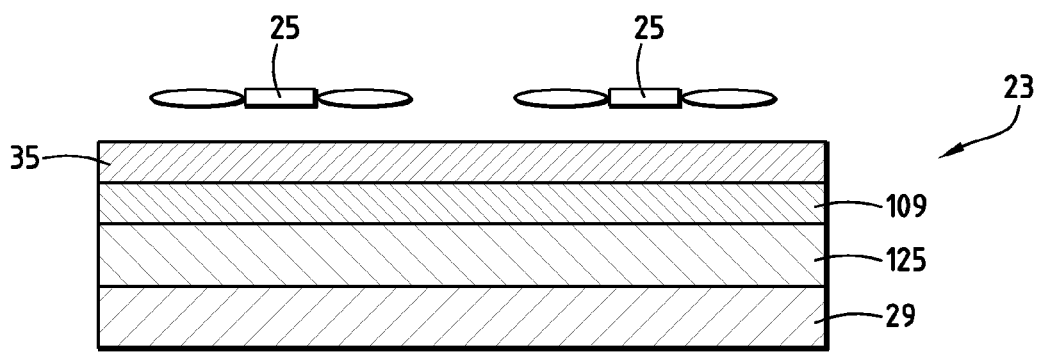

In the variant of the vehicle of FIG. 4B illustrated in FIG. 4C, an excess air cooler 125 is interposed between the second exchanger 109 and the radiator 29.

Figure 5:
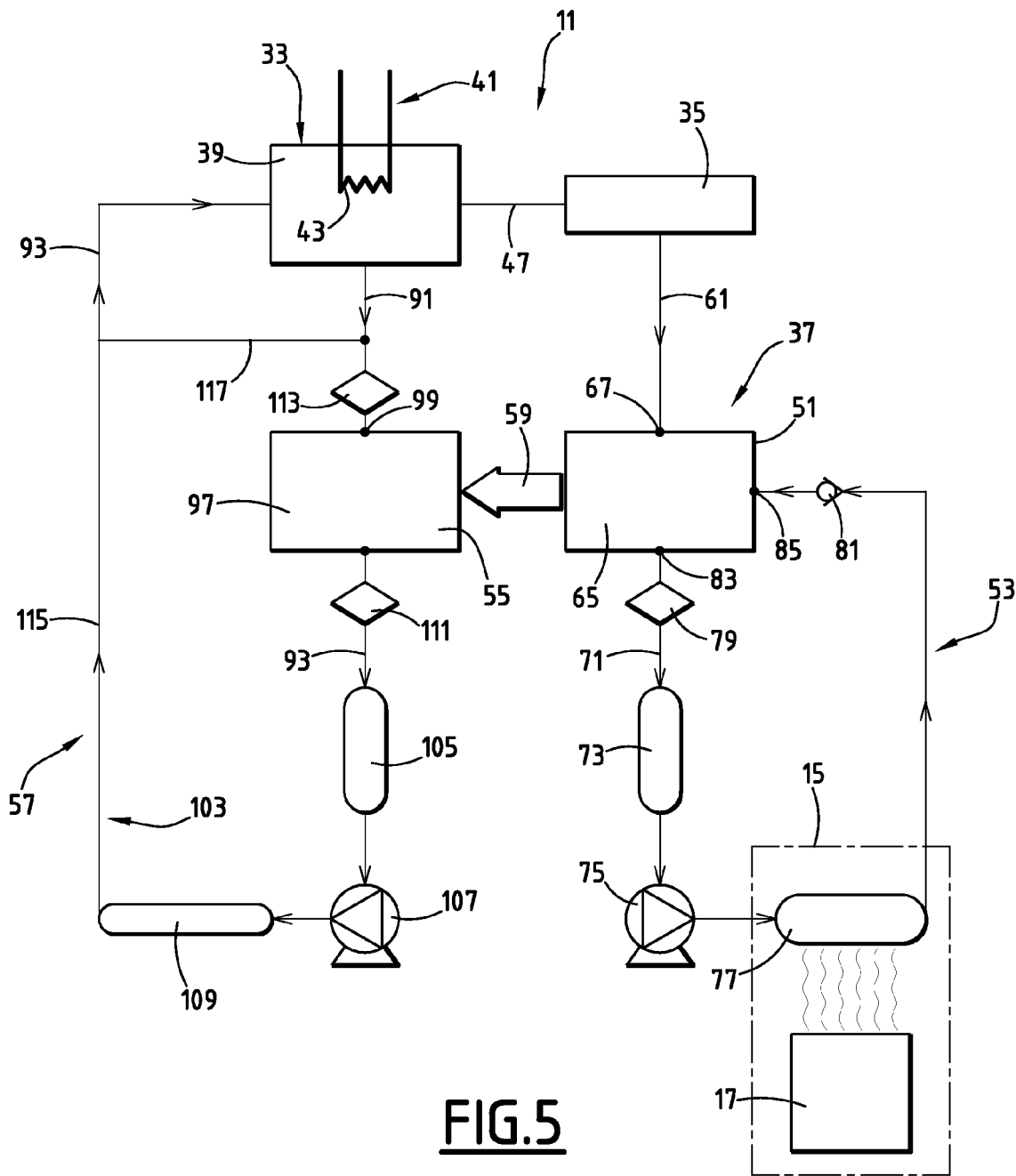
FIG. 5 is a view similar to FIG. 1 for a second cooling device according to the invention.

In another variant illustrated in FIG. 5, the downstream portion 117 of the recirculation conduit 103 opens in the liquid absorbent fluid supply conduit 91, upstream of the absorber 55.

The valve 113 is arranged downstream of the tapping point of the downstream portion 117 with respect to the supply conduit 91.

In another variant, the cooling circuit 57 is not provided with a reservoir 105 on the recirculation conduit 93. The reservoir is formed by the chamber 39.

Owing to the invention which has been described above, it is possible to provide an absorption cooling device 11 which can be readily installed in a motor vehicle in a compact manner.

The cooling fluid used in the absorption/desorption cycle is also used as a heat-transfer fluid with respect to the climate-control assembly 17 in the cooling circuit 53, so that the architecture of this system and the implementation thereof are simplified.

The weight of the system and the cost thereof are also notably reduced.

Advantageously the use of a common absorber/evaporator assembly 37 increases the cooling capacity of the device and is advantageous in terms of the efficiency thereof.

The invention claimed is:

1. Absorption cooling device comprising:
   a generator for generating cooling fluid and absorbent fluid by separating a mixed fluid;
   a cooling fluid condenser, which is connected to the generator;
   a cooling fluid evaporator which is connected to the condenser by means of a cooling fluid supply conduit, the evaporator having at least one region for evaporation of the cooling fluid in which the cooling fluid supply conduit opens;
   a cooling fluid absorber which is connected to the evaporation region and which is connected to the generator by means of an absorbent fluid supply conduit and a mixed fluid discharge conduit; and
   a cooling circuit comprising a cooling fluid circulation conduit for circulation of cooling fluid which has an upstream inlet and a downstream outlet which are connected to the evaporation region, the cooling fluid circulation conduit comprising a reservoir of cooling fluid, a pump and a first heat-exchanger which are mounted in series,
   wherein the first heat-exchanger is arranged downstream of the reservoir of cooling fluid and mounted higher than the reservoir of cooling fluid so that cooling fluid in the first heat-exchanger is allowed to migrate into the reservoir by means of gravity when the pump is idle,
   wherein the pump is arranged between the reservoir of cooling fluid and the first heat-exchanger,
   wherein the cooling fluid circulation conduit is provided with (i) a controllable blocking valve which is arranged between the upstream inlet of the cooling fluid circulation conduit and the reservoir so as to limit filling of the reservoir and prevent evaporation of the cooling fluid from the reservoir toward the evaporator when the device is inactive, and (ii) a non-return valve which is arranged between the first heat-exchanger and the downstream outlet of the cooling fluid circulation conduit in order not to discharge the cooling fluid present in this portion of the conduit into the evaporator in the event of the pump stopping.

2. Device according to claim 1, wherein the cooling circuit opens upstream in a downstream portion of the evaporation region and opens downstream in an upstream portion of the evaporation region.

3. Device according to claim 1, wherein the evaporation region comprises at least one evaporation plate, the cooling circuit comprising means for wetting the evaporation plate supplied by the cooling circuit and the cooling fluid supply conduit.

4. Device according to claim 1, wherein the discharge conduit comprises a cooling circuit which comprises a reservoir of mixed fluid, a pump and a second heat-exchanger which are mounted in series and a mixed fluid branch conduit which has an upstream inlet for the conduit common to the discharge conduit and a downstream outlet which is connected to the absorption region in order to recycle a portion of the mixed fluid directly into the absorber.

5. Device according to claim 4, wherein the branch conduit comprises a non-return valve.

6. Device according to claim 4, wherein the cooling circuit comprises a controllable blocking valve which is arranged upstream of the reservoir of mixed fluid.

7. Device according to claim 4, wherein the absorption region comprises at least one absorption plate, the cooling circuit comprising means for wetting the absorption plate which are supplied via the branch conduit and via the absorbent fluid supply conduit.

8. Device according to claim 4, wherein the evaporation region and the absorption region are located facing each other and together delimit a chamber for evaporated cooling fluid to migrate from the evaporator towards the absorber.

9. The device according to claim 1, wherein the evaporator comprises at least one porous plate and a liquid cooling fluid collector arranged below a lower downstream portion of the plate.

10. The device according to claim 1, wherein the absorber comprises a porous absorption plate and a mixed fluid collector arranged below a lower downstream portion of the plate.

11. The device according to claim 1,
wherein the mixed fluid discharge conduit has an upstream inlet and a downstream outlet which are connected to the absorber,
wherein the mixed fluid discharge conduit comprises a mixed fluid reservoir and a second heat-exchanger located downstream of the mixed fluid reservoir, and a mixed fluid circulation pump located between the mixed fluid reservoir and the second heat-exchanger,
wherein the mixed fluid discharge conduit circuit is provided with (i) a second valve which is arranged between the upstream inlet of the mixed fluid discharge circuit and the mixed fluid reservoir so as to isolate the mixed fluid reservoir from the absorber, and (ii) a second non-return valve which is arranged between the second heat-exchanger and the downstream outlet of the mixed fluid discharge conduit in order not to discharge the mixed fluid present in this portion of the discharge conduit into the absorber in the event of the mixed fluid circulation pump stopping.

12. The device according to claim 11, wherein the mixed fluid discharge conduit opens to an inlet of the generator and a third non-return valve is located upstream of the inlet of the generator.

13. Motor vehicle comprising:
a front face which is capable of receiving an external flow of air;
a climate-control assembly for the passenger space; and
a device according to claim 1, the first heat-exchanger being placed in a heat-exchange relationship with the climate-control assembly.

14. Motor vehicle according to claim 13, wherein the generator is supplied by the heat produced by the engine of the vehicle.

15. Motor vehicle according to claim 14, wherein the supply of the generator is controlled by means of an output control valve placed in the cooling system of the engine.

16. Motor vehicle comprising:
a front face which is capable of receiving an external flow of air, and a radiator located in the front face;
a climate-control assembly for the passenger space; and
a device according to claim 4,
wherein the first heat-exchanger are placed in a heat-exchange relationship with the climate-control, and
wherein the second heat-exchanger and the cooling fluid condenser are arranged beside each other on the front face in an upstream position relative to the radiator in a flow direction of air in the front face in order to receive the coldest air available.

17. Motor vehicle comprising:
a front face which is capable of receiving an external flow of air, and a radiator located in the front face;
a climate-control assembly for the passenger space; and
a device according to claim 4,
wherein the first heat-exchanger are placed in a heat-exchange relationship with the climate-control, and
wherein the second heat-exchanger and the cooling fluid condenser are arranged one on top of the other on the front face in an upstream position relative to the radiator a flow direction of air in the front face in order to receive the coldest air available.

18. Vehicle according to claim 17, wherein the second heat-exchanger and the condenser have a same cooling member with two separate circulation circuits in order to reduce the thickness of the front face.

19. Motor vehicle comprising:
a front face which is capable of receiving an external flow of air, and a radiator located in the front face;
a climate-control assembly for the passenger space; and
a device according to claim 11,
wherein the first heat-exchanger are placed in a heat-exchange relationship with the climate-control, and
wherein the second heat-exchanger and the cooling fluid condenser are arranged beside each other on the front face in an upstream position relative to the radiator a flow direction of air in the front face in order to receive the coldest air available.

20. Motor vehicle comprising:
a front face which is capable of receiving an external flow of air, and a radiator located in the front face;
a climate-control assembly for the passenger space; and
a device according to claim 11,
wherein the first heat-exchanger are placed in a heat-exchange relationship with the climate-control, and
wherein the second heat-exchanger and the cooling fluid condenser are arranged one on top of the other on the front face in an upstream position relative to the radiator a flow direction of air in the front face in order to receive the coldest air available.

* * * * *

UNITED STATES PATENT AND TRADEMARK OFFICE
CERTIFICATE OF CORRECTION

PATENT NO. : 8,561,423 B2  
APPLICATION NO. : 12/299260  
DATED : October 22, 2013  
INVENTOR(S) : Boudard et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this
Fifteenth Day of September, 2015

Michelle K. Lee
*Director of the United States Patent and Trademark Office*